United States Patent
Aguayo et al.

(10) Patent No.: US 12,380,889 B2
(45) Date of Patent: *Aug. 5, 2025

(54) ADAPTING AN UTTERANCE CUT-OFF PERIOD WITH USER SPECIFIC PROFILE DATA

(71) Applicant: SoundHound AI IP, LLC, Santa Clara, CA (US)

(72) Inventors: Patricia Pozon Aguayo, Sunnyvale, CA (US); Jennifer Hee Young Zhang, Campbell, CA (US); Jonah Probell, Alviso, CA (US)

(73) Assignee: SoundHound AI IP, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/401,770

(22) Filed: Jan. 2, 2024

(65) Prior Publication Data

US 2024/0135927 A1 Apr. 25, 2024

Related U.S. Application Data

(63) Continuation of application No. 17/698,623, filed on Mar. 18, 2022, now Pat. No. 11,862,162, which is a
(Continued)

(51) Int. Cl.
*G10L 15/22* (2006.01)
*G10L 15/05* (2013.01)
(Continued)

(52) U.S. Cl.
CPC .............. *G10L 15/22* (2013.01); *G10L 15/05* (2013.01); *G10L 15/1822* (2013.01);
(Continued)

(58) Field of Classification Search
CPC ....................................................... G06F 40/27
See application file for complete search history.

(56) References Cited

U.S. PATENT DOCUMENTS 5,457,768 A * 10/1995 Tsuboi .................... G10L 15/18
704/219
5,774,841 A 6/1998 Salazar et al.
(Continued)

FOREIGN PATENT DOCUMENTS

CN 107068147 8/2017
JP H03180899 8/1991
(Continued)

OTHER PUBLICATIONS

Office Action dated Feb. 12, 2024 in U.S. Appl. No. 18/206,567.
(Continued)

*Primary Examiner* — Douglas Godbold
(74) *Attorney, Agent, or Firm* — Pearl Cohen Zedek Latzer Baratz LLP

(57) ABSTRACT

A system detects a period of non-voice activity and compares its duration to a cutoff period. The system adapts the cutoff period based on parsing previously-recognized speech of a user that is stored on a user's device or the system, which detects the voice activity, to determine according to a model, such as a machine-learned model, the probability that the speech recognized so far is a prefix to a longer complete utterance. The cutoff period is longer when a parse of previously recognized speech, which is based on the user profile, has a high probability of being a prefix of a longer utterance.

15 Claims, 9 Drawing Sheets

Related U.S. Application Data continuation of application No. 16/824,308, filed on Mar. 19, 2020, now Pat. No. 11,308,960, which is a continuation of application No. 15/855,908, filed on Dec. 27, 2017, now Pat. No. 10,636,421.

(51) Int. Cl.
| | |
|---|---|
| *G10L 15/18* | (2013.01) |
| *G10L 25/78* | (2013.01) |
| G10L 15/08 | (2006.01) |
| G10L 15/19 | (2013.01) |
| G10L 15/30 | (2013.01) |

(52) U.S. Cl.
CPC ........ *G10L 25/78* (2013.01); *G10L 2015/088* (2013.01); *G10L 15/19* (2013.01); *G10L 15/30* (2013.01)

(56) References Cited

U.S. PATENT DOCUMENTS

| | | | |
|---|---|---|---|
| 5,848,388 A | 12/1998 | Power et al. | |
| 6,246,986 B1* | 6/2001 | Ammicht | G10L 15/22 |
| | | | 704/E15.04 |
| 6,496,799 B1* | 12/2002 | Pickering | G10L 15/04 |
| | | | 704/E15.005 |
| 6,631,346 B1 | 10/2003 | Karaorman et al. | |
| 6,650,652 B1 | 11/2003 | Valencia | |
| 7,734,468 B2 | 6/2010 | Park et al. | |
| 7,765,097 B1 | 7/2010 | Yu et al. | |
| 8,165,884 B2 | 4/2012 | Sanchez | |
| 8,762,154 B1 | 6/2014 | Witt-ehsani | |
| 8,843,369 B1* | 9/2014 | Sharifi | G10L 25/03 |
| | | | 704/235 |
| 9,437,186 B1* | 9/2016 | Liu | G10L 15/05 |
| 9,646,628 B1* | 5/2017 | Carlson | G10L 15/22 |
| 9,843,861 B1 | 12/2017 | Termeulen | |
| 10,096,328 B1 | 10/2018 | Markovich-Golan et al. | |
| 10,134,425 B1 | 11/2018 | Johnson, Jr. | |
| 10,224,030 B1* | 3/2019 | Kiss | G06F 40/284 |
| 10,339,918 B2* | 7/2019 | Hofer | G10L 15/22 |
| 10,510,340 B1* | 12/2019 | Fu | G10L 15/18 |
| 10,854,192 B1 | 12/2020 | Maas et al. | |
| 10,923,111 B1 | 2/2021 | Fan et al. | |
| 10,943,606 B2* | 3/2021 | Doshi | G10L 15/19 |
| 11,308,960 B2* | 4/2022 | Aguayo | G10L 15/22 |
| 11,862,162 B2* | 1/2024 | Aguayo | G10L 25/78 |
| 2003/0078928 A1 | 4/2003 | Dorosario et al. | |
| 2003/0083874 A1 | 5/2003 | Crane et al. | |
| 2003/0225579 A1 | 12/2003 | Wang et al. | |
| 2004/0193420 A1 | 9/2004 | Kennewick et al. | |
| 2005/0137939 A1 | 6/2005 | Calabria et al. | |
| 2005/0144064 A1 | 6/2005 | Calabria et al. | |
| 2005/0144065 A1 | 6/2005 | Calabria et al. | |
| 2005/0159945 A1 | 7/2005 | Otsuka et al. | |
| 2006/0080099 A1 | 4/2006 | Thomas et al. | |
| 2006/0100863 A1 | 5/2006 | Bretier et al. | |
| 2006/0200350 A1* | 9/2006 | Attwater | G10L 15/22 |
| | | | 704/E15.041 |
| 2006/0241948 A1 | 10/2006 | Abrash et al. | |
| 2006/0293886 A1 | 12/2006 | Odell et al. | |
| 2007/0288444 A1 | 12/2007 | Nelken et al. | |
| 2008/0071520 A1* | 3/2008 | Sanford | G06F 40/211 |
| | | | 704/E15.021 |
| 2008/0154594 A1 | 6/2008 | Itoh et al. | |
| 2008/0228496 A1 | 9/2008 | Yu et al. | |
| 2009/0064029 A1 | 3/2009 | Corkran et al. | |
| 2010/0124892 A1 | 5/2010 | Issa et al. | |
| 2011/0231185 A1 | 9/2011 | Kleffner et al. | |
| 2012/0046936 A1 | 2/2012 | Kandekar et al. | |
| 2012/0065960 A1 | 3/2012 | Iwama et al. | |
| 2012/0216178 A1 | 8/2012 | Gellerich et al. | |
| 2013/0055223 A1 | 2/2013 | Xu | |
| 2014/0039895 A1* | 2/2014 | Aravamudan | G06F 16/683 |
| | | | 704/257 |
| 2015/0206544 A1 | 7/2015 | Carter | |
| 2016/0148615 A1* | 5/2016 | Lee | G06F 1/3215 |
| | | | 704/275 |
| 2016/0379632 A1* | 12/2016 | Hoffmeister | G10L 25/87 |
| | | | 704/253 |
| 2017/0069309 A1* | 3/2017 | Aleksic | G10L 25/78 |
| 2017/0110118 A1* | 4/2017 | Tadpatrikar | G06F 16/685 |
| 2017/0178623 A1* | 6/2017 | Shamir | G10L 15/1822 |
| 2017/0256259 A1* | 9/2017 | Froelich | G10L 15/04 |
| 2018/0012616 A1 | 1/2018 | Salishev | |
| 2018/0061399 A1* | 3/2018 | Rose | G10L 15/22 |
| 2018/0090127 A1* | 3/2018 | Hofer | G10L 15/07 |
| 2018/0102135 A1 | 4/2018 | Ebenezer | |
| 2018/0102136 A1 | 4/2018 | Ebenezer | |
| 2018/0192191 A1 | 7/2018 | TerMeulen et al. | |
| 2018/0270565 A1 | 9/2018 | Ganeshkumar | |
| 2018/0308489 A1* | 10/2018 | Pan | G10L 15/22 |
| 2018/0330723 A1* | 11/2018 | Acero | G10L 15/30 |
| 2019/0007540 A1 | 1/2019 | Shaik et al. | |
| 2019/0098399 A1 | 3/2019 | Lashkari | |
| 2019/0251955 A1 | 8/2019 | Degraye et al. | |
| 2019/0311720 A1 | 10/2019 | Pasko | |
| 2019/0385635 A1 | 12/2019 | Shahen Tov et al. | |
| 2020/0213726 A1 | 7/2020 | Dyrholm | |
| 2020/0302922 A1 | 9/2020 | Jazi et al. | |
| 2021/0014925 A1 | 1/2021 | Apelqvist et al. | |
| 2021/0043223 A1 | 2/2021 | Lee et al. | |
| 2021/0306751 A1 | 9/2021 | Roach et al. | |
| 2023/0110708 A1 | 4/2023 | Hui et al. | |
| 2024/0312466 A1 | 9/2024 | Reouveni et al. | |

FOREIGN PATENT DOCUMENTS

| | | |
|---|---|---|
| JP | H08115093 | 5/1996 |
| JP | 2013072411 | 9/2013 |

OTHER PUBLICATIONS

Response to Office Action dated Aug. 12, 2024 in U.S. Appl. No. 18/206,567.
Final Office Action dated Sep. 10, 2024 in U.S. Appl. No. 18/206,567.
Office Action dated Aug. 23, 2024 in U.S. Appl. No. 18/375,906.
Voice Extensible Markup Language (VoiceXML) Version 2,0, W3C, 2004.
Antoine Raux, Flexible Turn-Taking for Spoken Dialog Systems, School of Computer Science Carnegie Mellon University, thesis, Dec. 2008.
Antoine Raux et al., A Finite-State Turn-Taking Model for Spoken Dialog Systems, Human Language Technologies: The 2009 Annual Conference of the North American Chapter of the ACL, pp. 629-637, Boulder, Colorado, Jun. 2009, Association for Computational Linguistics.
Antoine Raux et al., Optimizing End-of-Turn Detection for Spoken Dialog Systems, Workshop on Modeling Human Communication Dynamics at NIPS 2010, pp. 14-17.
Antoine Raux et al., Optimizing Endpointing Thresholds using Dialogue Features in a Spoken Dialogue System, Proceedings of the 9th SIGdial Workshop on Discourse and Dialogue, pp. 1-10, Columbus, Jun. 2008, Association for Computational Linguistics.
Antoine Raux et al., Optimizing the Turn-Taking Behavior of Task-Oriented Spoken Dialog Systems, ACM Transactions on Speech and Language Processing, vol. 9, No. 1, Article 1, Publication date: Apr. 2012.
Edward Gibson et al., Distinguishing Serial and Parallel Parsing, Journal of Psycholinguistic Research, vol. 29, No. 2, 2000, pp. 231-240.
Javier Gonzalez-Dominguez et al., A Real-Time End-to-End Multilingual Speech Recognition Architecture, IEEE Journal of Selected Topics in Signal Processing, vol. 9, No. 4, Jun. 2015, pp. 749-759.
Justine Cassell, More Than Just Another Pretty Face: Embodied Conversational Interface Agents, Cornrnunications of the ACM, 2000, vol. 43, pp. 70-78.
Karl Branting et al., Dialogue Management for Conversational Case-Based Reasoning, European Conference on Case-Based Reasoning ECCBR 2004: Advances in Case-Based Reasoning pp. 77-90.

(56) References Cited

OTHER PUBLICATIONS

Kyle Gorman, Automatic detection of turn-taking cues in spontaneous speech based on prosodic factors, 2006.

Luciana Ferrer et al., A Prosody-Based Approach to End-Of-Utterance Detection that Does Not Require Speech Recognition, Proceedings of ICASSP '03, 2003.

Mark Johnson, Parsing in Parallel on Multiple Cores and GPUs, Proceedings of Australasian Language Technology Association Workshop, pp. 29-37, Dec. 1, 2011.

Michaela Atterer et al., Towards Incremental End-of-Utterance Detection in Dialogue Systems, Coling 2008: Companion volume—Posters and Demonstrations, pp. 11-14 Manchester, Aug. 2008.

Ramalingam Hari Haran et al., Robust End-of-Utterance Detection for Real-Time Speech Recognition Applications, Proceedings. (ICASSP '01), 2001.

Takuma Okamoto et al., Reducing latency for language identification based on large-vocabulary continuous : speech recognition, The Acoustical Society of Japan, Acoust. Sci. & Tech. 38, 1 (2017).

Office Action dated Apr. 4, 2023 in U.S. Appl. No. 17/698,623.

Response to Office Action dated Aug. 4, 2023 in U.S. Appl. No. 17/698,623.

Notice of Allowance dated Aug. 25, 2023 in U.S. Appl. No. 17/698,623.

Office Action dated Oct. 15, 2021 in U.S. Appl. No. 16/824,308.

Response to Office Action dated Nov. 15, 2021 in U.S. Appl. No. 16/824,308.

Notice of Allowance dated Dec. 17, 2021 in U.S. Appl. No. 16/824,308.

Amendment Under 37 CFR 1.312 dated Mar. 17, 2022 in U.S. Appl. No. 16/824,308.

Response to Amendment Under 37 CFR 1.312 dated Mar. 24, 2022 in U.S. Appl. No. 16/824,308.

Restriction dated Jun. 14, 2019 in U.S. Appl. No. 15/855,908.

Response to Restriction dated Aug. 14, 2019 in U.S. Appl. No. 15/855,908.

Office Action dated Sep. 9, 2019 in U.S. Appl. No. 15/855,908.

Response to Office Action dated Nov. 22, 2019 in U.S. Appl. No. 15/855,908.

Final Office Action dated Dec. 13, 2019 in U.S. Appl. No. 15/855,908.

Response to Final Office Action dated Mar. 4, 2020 in U.S. Appl. No. 15/855,908.

Notice of Allowance dated Mar. 13, 2020 in U.S. Appl. No. 15/855,908.

Office Action dated Nov. 27, 2024 in U.S. Appl. No. 18/047,650.

\* cited by examiner

|       |    | 22 ↙ |       | 24 ↙ |       | 26 ↙ |
|-------|----|------|-------|------|-------|------|
| "hey robot, | | what's the weather | | in Timbuctoo | | " |
| VAD | no | yes | no | yes | no |
| parses | | no | yes | no | yes |
| period | 5 | 2 | 1 | 2 | 1 |

FIG. 2

|       |    | 32 ↙ | 34 ↙ |      | 36 ↙ |      |
|-------|----|------|------|------|------|------|
| "hey robot, | | what's the weather | in Timbuctoo | | " | |
| VAD | no | yes | no | yes | no |
| parses | | no | yes | no | yes |
| period | 4 | 1.6 | 0.8 | 1.6 | 0.8 |

FIG. 3

|       |    | 42 ↙ |      | 44 ↙ |
|-------|----|------|------|------|
| "hey robot, | | what's the | | " |
| VAD | no | yes | no | |
| parses | | no | | |
| period | 5 | 2 | | |

FIG. 4

ADAPTING AN UTTERANCE CUT-OFF PERIOD WITH USER SPECIFIC PROFILE DATA

CROSS-REFERENCE TO RELATED APPLICATIONS

This application is a Continuation of U.S. Pat. No. 11,862,162 issued on Jan. 2, 2024 and titled "Adapting An Utterance Cut-Off Period Based On Parse Prefix Detection" (application Ser. No. 17/698,623, filed on Mar. 18, 2022), which is a Continuation of U.S. Pat. No. 11,308,960 issued on Apr. 19, 2022 and titled "Adapting An Utterance Cut-Off Period Based On Parse Prefix Detection" (application Ser. No. 16/824,308, filed Mar. 19, 2020), which is a Continuation of U.S. Pat. No. 10,636,421 issued on Apr. 28, 2020 and titled "Parse Prefix-Detection In A Human-Machine Interface" (application Ser. No. 15/855,908, filed Dec. 27, 2017), all of which are herein incorporated by reference in their entirety.

TECHNICAL FIELD

The present invention is applicable in the field of natural language, turn-taking, speech-based, human-machine interfaces.

BACKGROUND

A sentence expresses a complete thought. Knowing when a thought is complete is important in machines with natural language, turn-taking, speech-based, human-machine interfaces. It tells the system when to speak in a conversation, effectively cutting off the user.

Some systems with speech interfaces that attempt to detect the end of a sentence (EOS) based on an amount of time with no voice activity detection (NVAD) use too short of a timeout period and, as a result, cut off people who speak slowly or with long pauses between words or clauses of a sentence.

Some systems that attempt to detect an EOS based on an amount of time with NVAD use a long timeout period and, as a result, are slow to respond at the end of sentences.

Both problems frustrate users.

SUMMARY

According to some embodiments, a natural language, turn-taking, speech-based human-machine interface parses words spoken to detect a complete parse. Some embodiments compute a hypothesis as to whether the words received so far, even for a complete parse, are a prefix to another complete parse.

According to some embodiments, the duration of a period of no voice activity detected (NVAD) determines the cut-off of an end of a sentence, and the NVAD cut-off period depends on the prefix hypothesis, which can be a Boolean or a numerical value.

Some embodiments profile users by their typical speech speed profile. Some embodiments compute a short-term measure of speech speed. Some embodiments scale the NVAD cut-off period based on one or both of the user's typical speech speed or the short-term measure of speech speed.

Some embodiments compute speech speed based on phoneme rate. Some embodiments compute speech speed by the time between words. Some embodiments use a continuously adaptive algorithm with corrections to adjust the NVAD cut-off period.

Some embodiments use a longer cut-off period after a system wake-up event but before the system detects any voice activity.

Adjusting the NVAD cut-off period, according to various embodiments, avoids cutting off slow speakers while improving responsiveness for fast speakers and avoiding pre-mature cut-offs for incomplete sentences.

BRIEF DESCRIPTION OF THE DRAWINGS

FIG. 2 shows a sentence with pauses and its periods of voice activity detection, periods of complete parses, and its dynamic NVAD cut-off period.

FIG. 3 shows a sentence from a fast speaker with pauses and its periods of voice activity detection, periods of complete parses, and its dynamic NVAD cut-off period.

FIG. 4 shows a timeout after a long pause during an incomplete parse.

DETAILED DESCRIPTION

Figure 1:
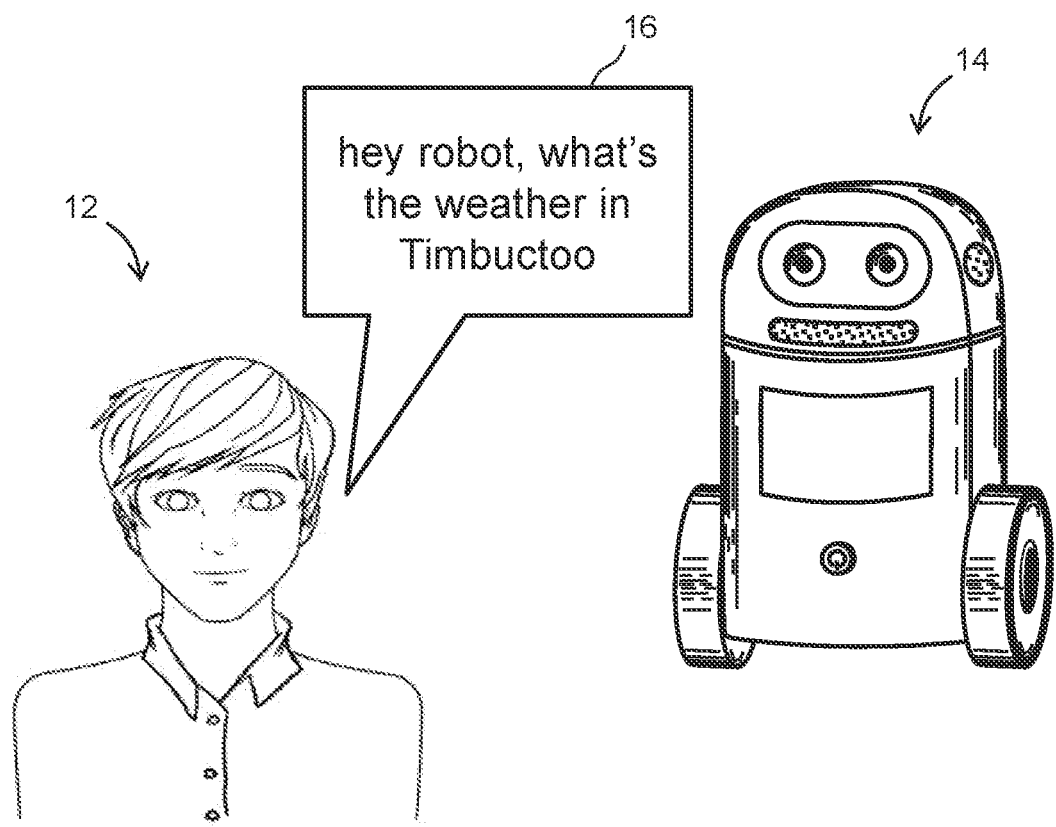
FIG. 1 shows a human interfacing with a machine according to an embodiment.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

Some embodiments begin parsing speech in response to a wake-up event such as a user saying a key phrase such as "hey Alexa", a user tapping a microphone button, or a user gazing at a camera in a device. Such embodiments eventually cut off after a NVAD cut-off period. Some embodiments parse speech continuously, but cut off the parsing of a sentence, treating it as complete, after a NVAD cut-off period.

To be responsive to fast speech without cutting off slow speech it is ideal to adapt the EOS NVAD period to the maximum pause length between words within an incomplete sentence.

Some embodiments do so by having a set of cutoff periods and using a shorter one when the words captured so far constitute a complete parse according to a natural language grammar and a longer cutoff period when the words captured so far do not constitute a complete parse.

Some such embodiments have a problem of cutting off users when the words so far are a complete parse but are a prefix to a longer sentence. For example, "what's the weather" is a parsable prefix of the sentence, "what's the weather in Timbuctoo", which is a prefix of the sentence, "what's the weather in Timbuctoo going to be tomorrow".

Some embodiments have a problem with users not recognizing that the system detected a wake-up event and is attempting to parse speech. In such events, there can be long periods of silence before the user provides any speech voice activity. Some embodiments address this by having a long NVAD cut-off period for the time after a wake-up event occurs and before the system detects any voice activity. Some embodiments use a long NVAD period of 5 seconds. Some embodiments use a long NVAD period of 3.14159 seconds.

FIG. 1 shows an embodiment of a human-machine interface. A human user 12 speaks to a machine 14, saying, "hey robot, what's the weather in Timbuctoo", as depicted by a speech bubble 16.

Training a Model

Some words spoken so far, having a complete parse, are very likely the entire user's sentence, for example, "how high is Mount Everest". It is possible, but infrequent, that a user would continue the sentence such as by saying, "how high is Mount Everest in Nepal". In fact, it is rare that any sentence beginning with "how high is <thing>" going to be continued. However, Some words spoken so far, having a complete parse, are frequently followed by more information that creates another longer complete parse. For example, "what's the weather" (which implies a query about the present time and current location) is a complete parse that is often continued such as by saying, "what's the weather going to be tomorrow" or "what's the weather in <place>".

Some embodiments use a trained model of whether a complete parse is a user's intended complete sentence. The model in some embodiments is a neural network. Various other types of models are appropriate for various embodiments.

Some embodiments use a statistical language model (SLM). They train the SLM using n-grams that include an end of sentence token.

Some embodiments train a model from a corpus of captured spoken sentences. Some embodiments that use data from systems that cut off speech after EOSs, to avoid biasing the model with data from prematurely cut-off sentences, continue capturing sentences for a period of time after EOSs and discard sentences with speech after the EOS from the training corpus.

Some embodiments train a model from sources of natural language expressions other than captured speech, such as The New York Times, Wikipedia, or Twitter. Some embodiments train models from sources of speech not subject to EOSs, such as movies and videos.

Some embodiments train a model by analyzing natural language grammar rules to determine all possible complete parses in order to determine which complete parses are prefixes to other complete parses. Some such embodiments apply weights based on likelihoods of particular forms of parsable sentences.

Some embodiments aggregate multiple grammar rules to detect complete parses that are prefixes of other complete parses. This is useful because some sets of words so far are parsable according to multiple grammar rules.

Some embodiments replace specific entity words with generic tags in the training corpus. For example, a generic person tag replaces all people's names and a generic city tag replaces all city names. Applying such a model requires that word recognition or parsing apply a corresponding replacement of entity words with generic tags.

Applying a Model

Some embodiments have multiple NVAD cut-off periods, a long one when there is no complete parse (Incomplete) and a short one when there is a complete parse (Complete). Some such embodiments have another NVAD cut-off period longer than the short one for when there is a complete parse that can be a prefix to another complete parse (Prefix). Some embodiments have another NVAD cut-off period longer than the long one for the time after the system wakes up but before it detects any voice activity (Initial).

FIG. 2 shows processing a spoken sentence that comprises a first complete parse ("what's the weather") that is a prefix to a second complete parse ("what's the weather in Timbuctoo"). The speech begins with a wake-up key phrase "hey robot", followed by a period of no voice activity detection (VAD) 22. The system chooses a NVAD cut-off period of 5 seconds. Next, the system detects voice activity and proceeds to receive words, "what's the weather", during which time there is no complete parse and so the system chooses a NVAD cut-off period of 2 seconds. Next, there is a pause in the speech 24, during which time there is no VAD, but a complete parse. Since there is a complete parse, the system chooses a shorter NVAD period of 1 second. Next, the speech continues, so there is VAD but again no complete parse, so the system returns to a NVAD cut-off period of 2 seconds. Finally, is another period of silence 26, during which there is no VAD, but a complete parse, so the system chooses a NVAD period of 1 second.

Some embodiments apply the model for detecting whether a complete parse is a prefix to another longer complete parse in response to detecting the first complete parse. Some embodiments apply the model continuously, regardless of whether the words received so far constitute a complete parse. Such embodiments effectively have a continuous hypothesis as to whether the sentence is complete, the hypothesis has maxima whenever a set of words comprises a complete parse, the maxima being larger for complete parses that are less likely to be prefixes of other complete parses.

In some embodiments, the model produces not a Boolean value, but a numerical score of a likelihood of a complete parse being a complete sentence. Some such embodiments, rather than having a specific Prefix cut-off period, scale the Prefix cut-off period according to the score. A higher score would cause a shorter NVAD cut-off period.

Some embodiments use a continuously adaptive algorithm to continuously adapt the NVAD cut-off period. Some such embodiments gradually decrease one or more NVAD cut-off periods, such as by 1% of the NVAD cut-off period each time there is a cut-off, and, if the speaker continues a sentence after a partial period threshold, such as 80%, the NVAD cut-off period, the NVAD cut-off period increases, such as by 5% for each such occurrence of a user continuing a sentence. Some embodiments increase the NVAD cut-off period in proportion to the amount of time beyond a partial-period threshold (such as 80%) after which that the user continued the sentence.

Some embodiments display information visually after detecting a complete parse but before a NVAD cut-off. Some such embodiments change the visual display as soon as they detect further voice activity before the NVAD cut-off. For example, for the sentence "what's the weather going to be tomorrow in Timbuctoo" such an embodiment would:

as soon as the user finishes saying, "what's the weather" display the current weather in the present location;
  as soon as the user says, "going" clears the display;
  as soon as the user finishes saying, "to be tomorrow" displays the weather forecast for tomorrow in the present location;
  as soon as the user says, "in" clears the display; and
  as soon as the user says, "Timbuctoo" displays the weather forecast for tomorrow in Timbuctoo.

Some embodiments do not cut off user speech when detecting an EOS, but instead, use the NVAD cut-off period to determine when to perform an action in response to the sentence. This supports an always-listening experience that doesn't require a wake-up event. Even for always-listening embodiments, knowing when to respond is important to avoid the response interrupting the user or the response performing a destructive activity that wasn't the user's intent.

Profiling Users

Some embodiments profile users as to their typical speech speed, store the user's typical speech speed in a user profile, later acquire the user's typical speech speed from the user profile, and scale one or more of the NVAD cut-off periods according to the user's typical speech speed.

Some embodiments compute a user's typical speech speed by detecting their phoneme rate. That is, computing their number of phonemes per unit time. Some embodiments store a long-term average phoneme rate in the user's profile. Some embodiments compute a short-term average phoneme rate, which is useful since user phoneme rates tend to vary based on environment and mood.

Some embodiments compute a user's typical speech speed by detecting their inter-word pause lengths. That is, using the time between the last phoneme of each word and the first phoneme of its immediately following word. Long-term and short-term inter-word pause length calculations are both independently useful to scale the NVAD cut-off period.

FIG. 3 shows processing a spoken sentence that comprises a first complete parse ("what's the weather") that is a prefix to a second complete parse ("what's the weather in Timbuctoo"). However, in comparison to the scenario of FIG. 2, based on the user profile and short-term speech speed, the system expects the user to speak 25% faster (therefore using 80% as much time for the same sentence). The speech begins with a wake-up key phrase "hey robot", followed by a period of no voice activity detection (VAD) 32. The system chooses a NVAD cut-off period of just 4 seconds. Next, the system detects voice activity and proceeds to receive words, "what's the weather", during which time there is no complete parse and so the system chooses a NVAD cut-off period of just 1.6 seconds. Next, there is a pause in the speech 34, during which time there is no VAD, but a complete parse. Since there is a complete parse, the system chooses a shorter NVAD period of just 0.8 seconds. Next, the speech continues, so there is VAD but again no complete parse, so the system returns to a NVAD cut-off period of just 1.6 seconds. Finally, is another period of silence 36, during which there is no VAD, but a complete parse, so the system chooses a NVAD period of just 0.8 seconds.

FIG. 4 shows processing speech that never achieves a complete parse. The speech begins with a wake-up key phrase "hey robot", followed by a period of no voice activity detection (VAD) 42. The system chooses a NVAD cut-off period of 5 seconds. Next, the system detects voice activity and proceeds to receive words, "what's the", during which time there is no complete parse and so the system chooses a NVAD cut-off period of 2 seconds. No more speech is received for the following period 44, so after the system detects NVAD, it cuts off after 2 more seconds.

EOS Cues

Some embodiments choose a short EOS when detecting certain cues such as a period of NVAD followed by "woops" or a period of NVAD followed by "cancel".

Some embodiments delay an EOS when detecting certain cues, such as "ummm" or "ahhh" or other filler words. The word "and", "but", "with" or phrases such as, "as well as" are also a high probability indicator of a likely continuation of a sentence. Some such embodiments, when detecting such filler words or conjunctions, reset the EOS NVAD cut-off timer.

Client-Server Considerations

Some embodiments perform NVAD on a client and some embodiments perform word recognition and grammar parsing on a server connected to the client through a network such as the Internet. Such embodiments send and receive messages from time to time from the server to the client indicating whether an end of sentence token is likely or a parse is complete or a prefix parse is complete. Such embodiments of clients assume an incomplete parse, and therefore a long NVAD cut-off period, from whenever the client detects NVAD until reaching a cut-off unless the client receives a message indicating a complete parse in between.

Some client-server embodiments send either a voice activity indication, a NVAD indication, or both from the client to the server. This is useful for the server to determine NVAD cut-off periods. However, the amount of network latency affects the inaccuracy of the NVAD cut-off period calculation.

Implementations

Figure 5A:
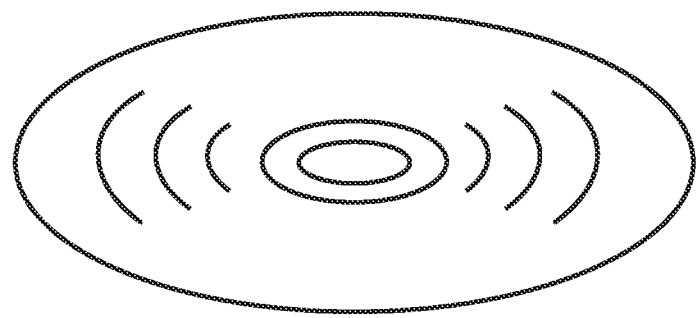
FIG. 5A shows a rotating disk non-transitory computer readable medium according to an embodiment.
Figure 5B:
FIG. 5B shows a non-volatile memory chip non-transitory computer readable medium according to an embodiment.

FIG. 5A shows a rotating disk non-transitory computer readable medium according to an embodiment. It stores code that, if executed by a computer, would cause the computer to perform any of the methods described herein. FIG. 5B shows a non-volatile memory chip non-transitory computer readable medium according to an embodiment. It stores code that, if executed by a computer, would cause the computer to perform any of the methods described herein.

Figure 5C:
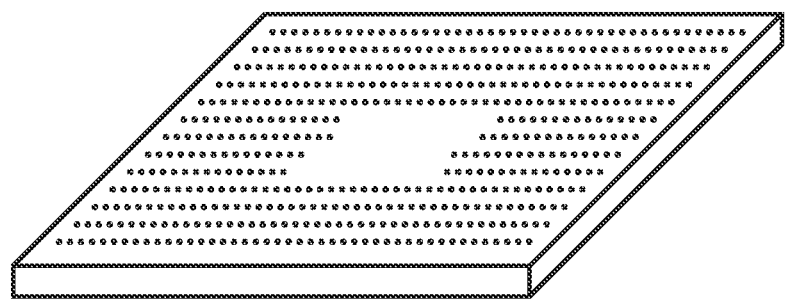
FIG. 5C shows a computer processor chip for executing code according to an embodiment.

FIG. 5C shows a computer processor chip for executing code according to an embodiment. By executing appropriate code, it can control a system to perform any of the methods described herein.

Figure 6:
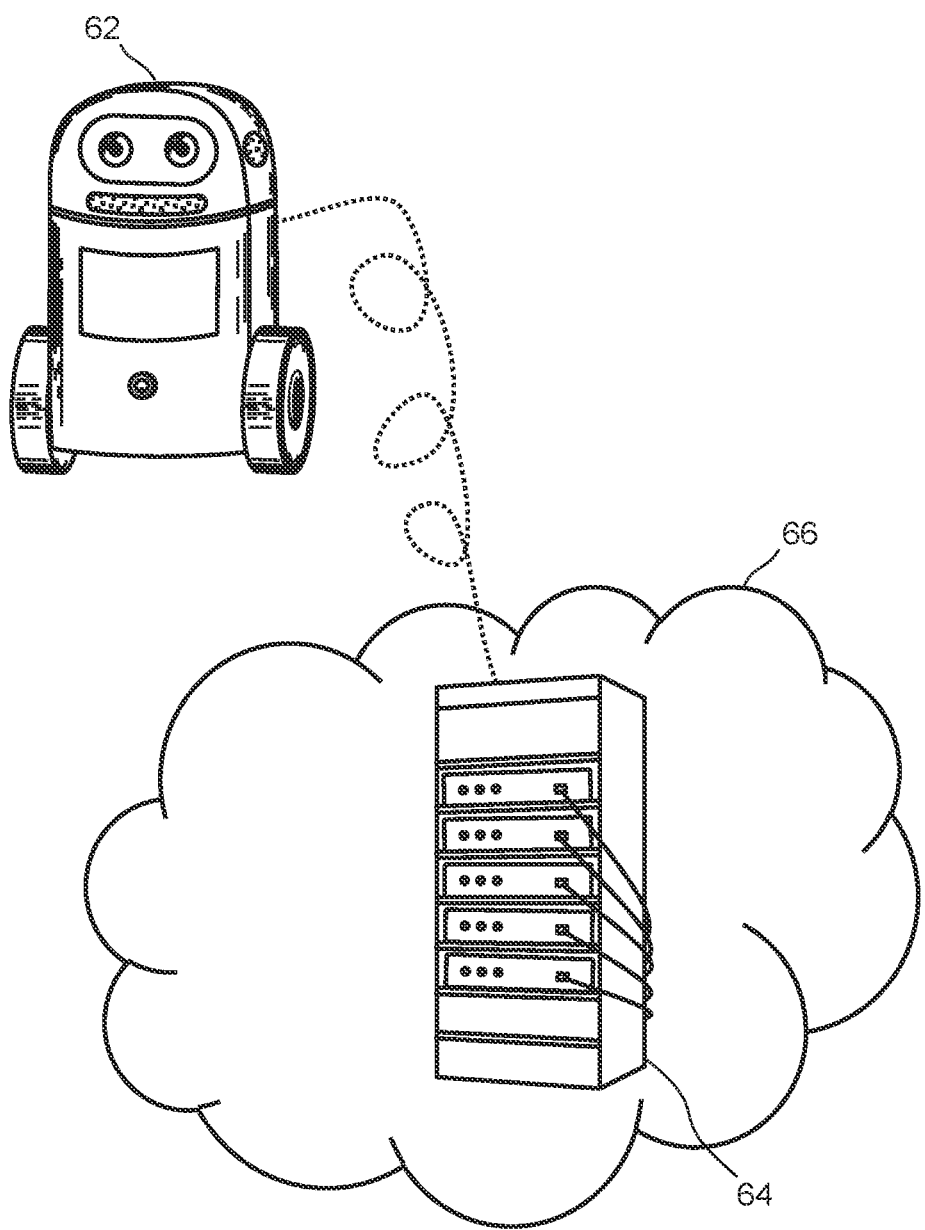
FIG. 6 shows a human interface device coupled to a cloud server according to an embodiment.

FIG. 6 shows a human interface device 62 coupled to a server 64 in a virtual could 66 according to an embodiment. The human interface device 62 receives user speech and sends it to the server 64. In some embodiments, the server 64 performs VAD. In some embodiments the device 62 performs VAD and the server performs parsing of the speech. In some embodiments, the device 62 works independently of a server and performs parsing and VAD.

Figure 7:
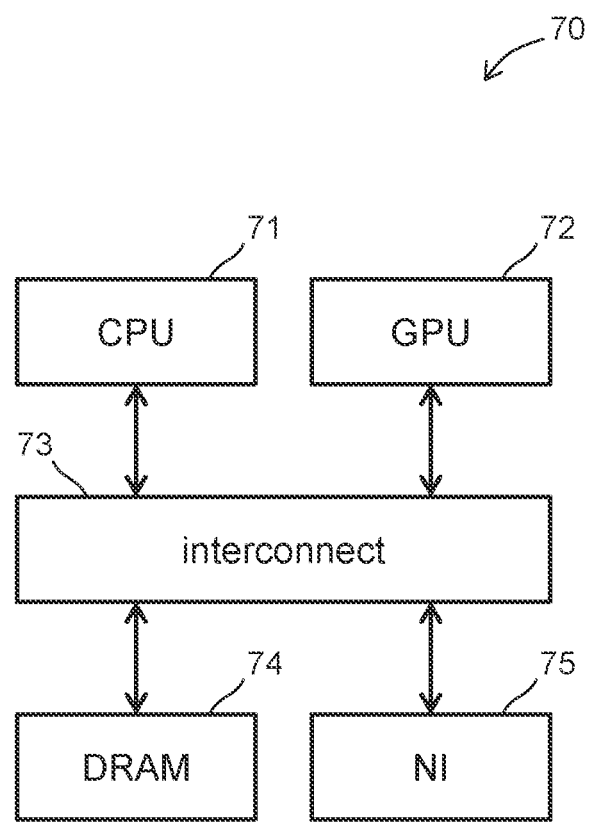
FIG. 7 shows a block diagram of a processor chip according to an embodiment.

FIG. 7 shows a block diagram of a computer system 70 according to an embodiment. It comprises a central processing unit (CPU) 71 and a graphics processing unit (GPU) 72 that are each optimized for processing that parses speech. They communicate through an interconnect 73 with a dynamic random access memory (DRAM) 74. The DRAM 74 stores program code and data used for processing. The CPU 71 and GPU 72 also communicate through interconnect 73 with a network interface (NI) 75. The NI provides access to code and data needed for processing as well as communication between devices and servers such as for sending audio information or messages about voice activity or parse completion.

Figure 8:
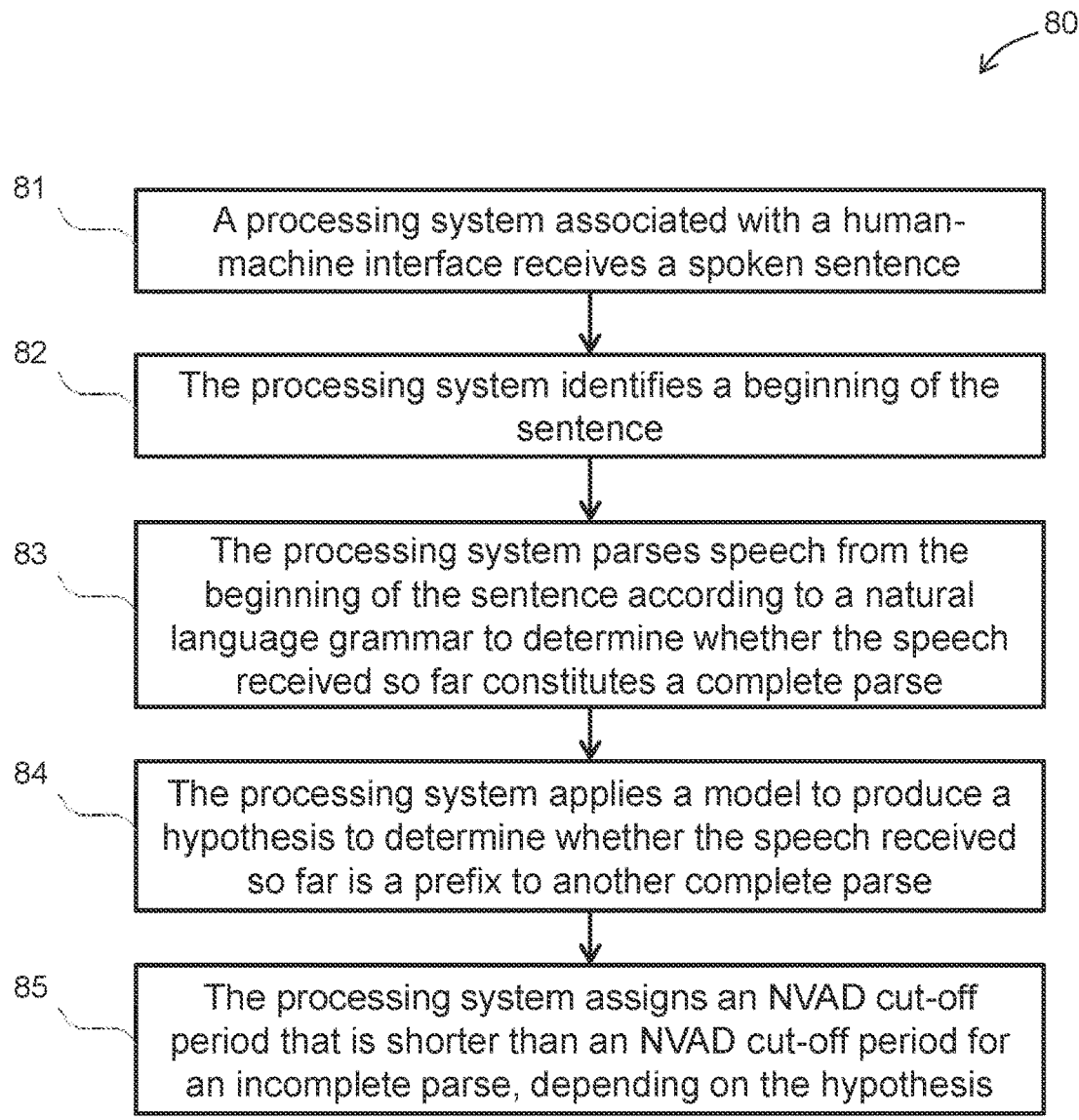
FIG. 8 is a flow diagram depicting an embodiment of a method to assign an NVAD cut-off period.

FIG. 8 is a flow diagram depicting an embodiment of a method 80 to assign an NVAD cut-off period. At 81, a processing system associated with a human-machine interface receives a spoken sentence. In some embodiments, the processing system may be realized by a system based on processor chip 70 or any similar processing-enabled architecture. Next, at 82, the processing system identifies a beginning of the sentence. In some embodiments, the processing system identifies the beginning of the sentence by identifying a phrase such as, "hey robot," a user tapping a microphone button, or a user gazing at a camera associated with the processing system, as described herein. Next, at 83, the processing system parses speech from the beginning of the sentence according to a natural language grammar to determine whether the speech received so far constitutes a complete parse. At 84, the processing system applies a model to produce a hypothesis to determine whether the speech received so far is a prefix to another complete parse. Finally, at 85, the processing system assigns an NVAD cut-off period that is shorter than an NVAD cut-off period for an incomplete parse, depending on the hypothesis.

Figure 9:
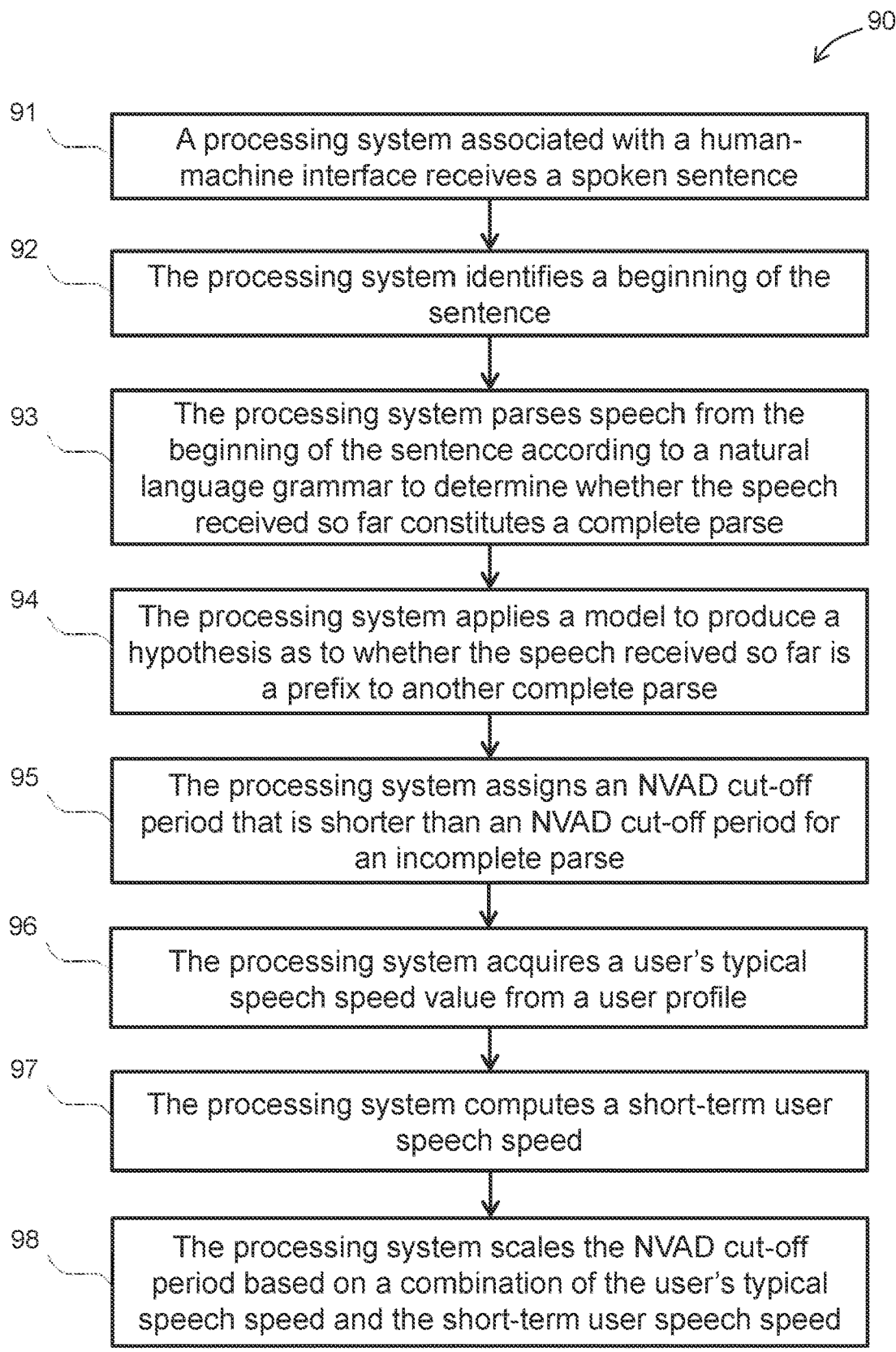
FIG. 9 is a flow diagram depicting an embodiment of a method to scale an NVAD cut-off period.

FIG. 9 is a flow diagram depicting an embodiment of a method 90 to scale an NVAD cut-off period. At 91, a processing system associated with a human-machine interface receives a spoken sentence. In some embodiments, the processing system may be realized by a system based on processor chip 70 or any similar processing-enabled architecture. In particular embodiments, the spoken sentence may be a recorded sentence, a text-to-speech input, an audio recording, or some other speech input. At 92, the processing system identifies a beginning of a sentence, as discussed in the description of method 80. Next, at 93, the processing system parses speech from the beginning of the sentence according to a natural language grammar to determine whether the speech received so far constitutes a complete parse. At 94, the processing system applies a model to produce a hypothesis as to whether the speech received so far is a prefix to another complete parse. At 95, the processing system assigns an NVAD cut-off period that is shorter than an NVAD cut-off period for an incomplete parse. Next, at 96, the processing system acquires a user's typical speech speed value from a user profile that may be stored on a memory unit such as DRAM 74. At 97, the processing system computes a short-term user speech speed. Finally, at 98, the processing system scales the NVAD cut-off period based on a combination of the user's typical speech speed and the short-term user speech speed.

Figure 10:
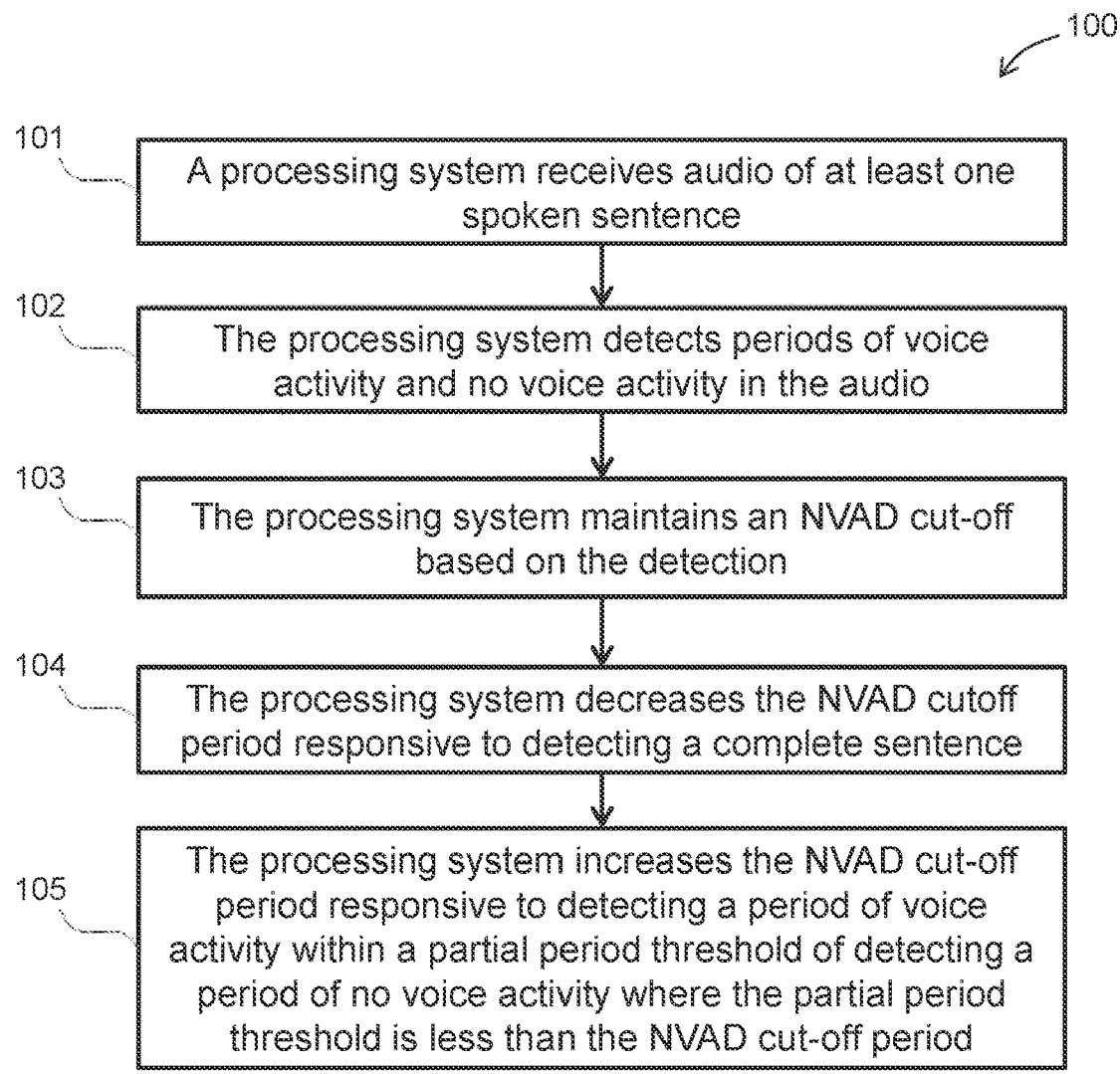
FIG. 10 is a flow diagram depicting an embodiment of a method to increase an NVAD cut-off period.

FIG. 10 is a flow diagram depicting an embodiment of a method 100 to increase an NVAD cut-off period. At 101, a processing system receives audio of at least one spoken sentence. Next, at 102, the processing system detects periods of voice activity and no voice activity in the audio associated with the spoken sentence. At 103, the processing system maintains an NVAD cut-off based on the detection. At 104, the processing system decreases the NVAD cutoff period responsive to detecting a complete sentence. Finally, at 105, the processing system increases the NVAD cut-off period responsive to detecting a period of voice activity within a partial period threshold of detecting a period of no voice activity where the partial period threshold is less than the NVAD cut-off period.

Figure 11:
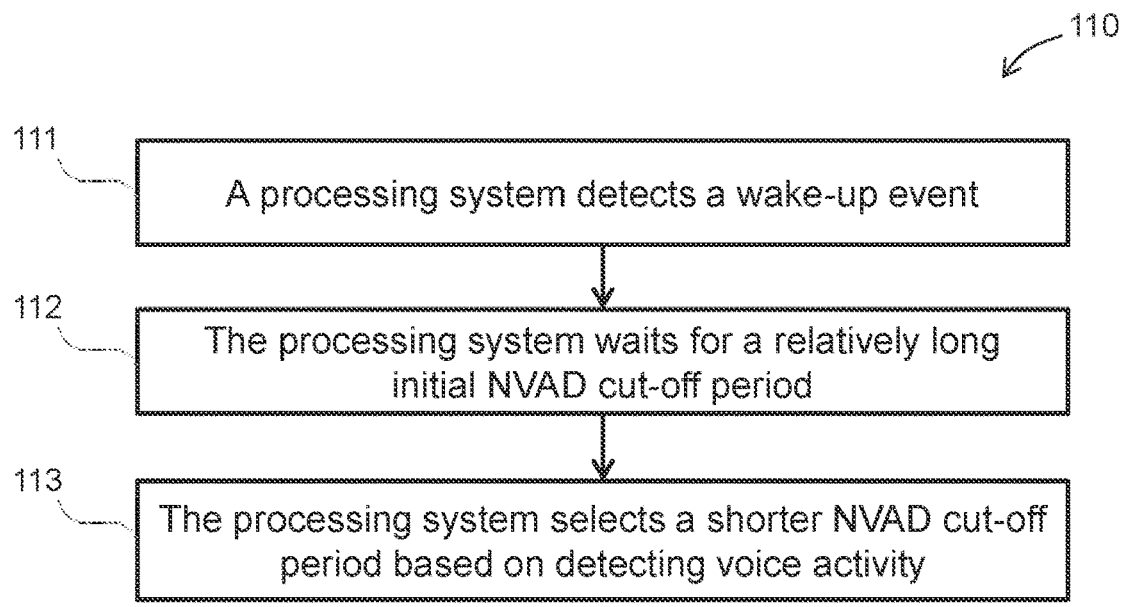
FIG. 11 is a flow diagram depicting an embodiment of a method for changing a duration of an NVAD cut-off period.

FIG. 11 is a flow diagram depicting an embodiment of a method 110 for changing a duration of an NVAD cut-off period. At 111, a processing system detects a wake-up event as discussed herein. At 112, the processing system waits for a relatively long initial NVAD cut-off period. Finally, at 113, the processing system selects a shorter NVAD cut-off period based on detecting voice activity—this shorter NVAD cut-off period is relative to the relatively long initial NVAD cut-off period. In some embodiments, the relatively long initial NVAD cut-off period is 5 seconds. In other embodiments, the relatively long initial NVAD cut-off period is 3.14159 seconds.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

What is claimed is:

1. A method comprising: detecting, at a user device, an utterance comprising periods of voice activity and periods of no voice activity within a plurality of spoken words;
   parsing the plurality of spoken words according to a first grammar and a second grammar to determine if the plurality of spoken words is at least one of a complete parse according to the first grammar and a prefix to another complete parse according to the second grammar;
   accessing a no voice activity detection (NVAD) cut-off period calculated from prior speech associated with a user profile stored at the user device;
   scaling the NVAD cut-off period, which prevents premature cutting off slow voice activity and improves responsiveness to fast voice activity, based at least in part on determining whether the plurality of spoken words is at least one of a complete parse according to the first grammar and a prefix to another complete parse according to the second grammar; and
   performing speech recognition using the NVAD cut off period to detect the end of the utterance.

2. The method of claim 1, wherein parsing the plurality of spoken words according to a first grammar and a second grammar comprises producing a prefix hypothesis numerical score indicating a likelihood that the plurality of spoken words is both: (a) the complete parse and (b) the prefix to another complete parse and wherein scaling the NVAD cut-off period includes scaling the NVAD cut-off period in accordance with the prefix hypothesis numerical score.

3. The method of claim 2, wherein producing the prefix hypothesis numerical score comprises analyzing natural grammar rules determining that the plurality of spoken words is a complete parse prefix.

4. The method of claim 3, wherein analyzing natural grammar rules comprises aggregating grammar rules from the first grammar and the second grammar.

5. The method of claim 2, wherein scaling the NVAD cut-off period is based on the plurality of spoken words being a complete parse prefix.

6. The method of claim 1, wherein detecting periods of voice activity and periods of no voice activity within the plurality of spoken words comprises detecting inter-word pause lengths.

7. The method of claim 1, further comprising:
   computing an average phoneme rate from the periods of voice activity and the periods of no voice activity within the plurality of spoken words; and
   scaling the NVAD cut-off period based on the average phoneme rate.

8. A device comprising:
   a processor; and
   system memory coupled to the processor and storing instructions configured to cause the processor to:
   detect, at the device, an utterance comprising periods of voice activity and periods of no voice activity within a plurality of spoken words;

parse the plurality of spoken words according to a first grammar and a second grammar to determine if the plurality of spoken words is at least one of a complete parse according to the first grammar and a prefix to another complete parse according to the second grammar;

assess a no voice activity detection (NVAD) cut-off period calculated from prior speech associated with a user profile stored at the device;

scale the NVAD cut-off period, which prevents premature cutting off slow voice activity and improves responsiveness to fast voice activity, based at least in part on determining whether the plurality of spoken words is at least one of a complete parse according to the first grammar and a prefix to another complete parse according to the second grammar, and a speech speed profile of the user, wherein the speech speed profile is computed based on phoneme rate or time between words; and perform speech recognition using the NVAD cut off period to detect the end of the utterance;

wherein scaling the NVAD cut-off period comprises selecting from a plurality of NVAD cut-off periods, including a shorter cut-off period for a complete parse, a longer cut-off period for a prefix, and a longest cut-off period after a wake-up event.

9. The device of claim 8, wherein instructions configured to parse the plurality of spoken words according to a first grammar and a second grammar comprise instructions configured to produce a prefix hypothesis numerical score indicating a likelihood that the plurality of spoken words is both: (a) the complete parse and (b) the prefix to another complete parse, wherein instructions configured to scale the NVAD cut-off period in accordance with the prefix hypothesis numerical score.

10. The device of claim 9, wherein instructions configured to produce the prefix hypothesis numerical score comprise instructions configured to analyze natural grammar rules determining that the plurality of spoken words is a complete parse prefix.

11. The device of claim 10, wherein instructions configured to analyze natural grammar rules comprise instructions configured to aggregate grammar rules from the first grammar and the second grammar.

12. The device of claim 9, wherein instructions configured to scale the NVAD cut-off period comprise instructions configured to scale the NVAD cut-off period based on the plurality of spoken words being a complete parse prefix.

13. The device of claim 8, wherein instructions configured to detect periods of voice activity and periods of no voice activity within the plurality of spoken words comprise instructions configured to detect inter-word pause lengths.

14. The device of claim 8, further comprising instructions configured to:

compute an average phoneme rate from the periods of voice activity and the periods of no voice activity within the plurality of spoken words; and scale the NVAD cut-off period based on the average phoneme rate.

15. A method for adjusting a no voice activity detection (NVAD) cut-off period of an interface device that detects a plurality of spoken words and voice activities, the method comprising:

detecting, at a device, an utterance comprising periods of voice activity and periods of no voice activity within the plurality of spoken words;

parsing, using the device, the plurality of spoken words according to a first grammar and a second grammar to determine if the plurality of spoken words is at least one of a complete parse according to the first grammar and a prefix to another complete parse according to the second grammar;

accessing the NVAD cut-off period calculated from a prior voice activity according to data stored about a user profile that is stored at the device;

generating a new NVAD cut-off period, which prevents cut-off of slow voice activity and improves response time to fast voice activity, by scaling the NVAD cut-off period based at least in part on determining if the plurality of spoken words is a complete parse according to the first grammar and a prefix to another complete parse according to the second grammar, and a speech speed profile of the user, wherein the speech speed profile is computed based on phoneme rate or time between words; and performing speech recognition using the NVAD cut off period to detect the end of the utterance;

wherein scaling the NVAD cut-off period comprises selecting from a plurality of NVAD cut-off periods, including a shorter cut-off period for a complete parse, a longer cut-off period for a prefix, and a longest cut-off period after a wake-up event.

* * * * *